United States Patent [19]

Müller

[11] 4,259,980
[45] Apr. 7, 1981

[54] BUTTERFLY VALVE ASSEMBLY AND METHOD OF MANUFACTURING THE SAME

[76] Inventor: Fritz Müller, Am Bahnhof, D-7118 Ingelfingen-Criesbach, Fed. Rep. of Germany

[21] Appl. No.: 6,231

[22] Filed: Jan. 24, 1979

Related U.S. Application Data

[63] Continuation-in-part of Ser. No. 974,568, Dec. 29, 1978, abandoned.

[30] Foreign Application Priority Data

Dec. 30, 1977 [DE] Fed. Rep. of Germany ....... 2759000

[51] Int. Cl.³ .............................................. F16K 1/22
[52] U.S. Cl. .................................. 137/375; 251/214; 251/306
[58] Field of Search ....................... 251/306, 214, 305; 137/375

[56] References Cited

U.S. PATENT DOCUMENTS

| | | | |
|---|---|---|---|
| 1,998,882 | 4/1935 | Merrill | 137/375 |
| 2,202,735 | 5/1940 | Johnson | 137/375 |
| 3,661,171 | 5/1972 | Smith et al. | 137/375 |
| 3,778,028 | 11/1973 | Graves et al. | 137/375 |

FOREIGN PATENT DOCUMENTS

| | | | |
|---|---|---|---|
| 2158634 | 6/1973 | Fed. Rep. of Germany | 251/306 |
| 2460182 | 7/1975 | Fed. Rep. of Germany | 137/375 |

*Primary Examiner*—Martin P. Schwadron
*Assistant Examiner*—A. Michael Chambers
*Attorney, Agent, or Firm*—Michael J. Striker

[57] ABSTRACT

A check valve assembly has a housing, and a throttle valve which includes a throttling disc rotatable in the housing and a spindle connected with the throttling disc for rotating the latter. The throttle valve is coated with a protective jacket of a synthetic plastic material, which is of one piece and coats the throttling disc and the spindle, including portions of the latter which extend outwardly beyond the housing. The inner side of the housing may be coated by a protective lining which coats an inner side of the housing facing toward the throttle valve. An additional elastic lining may urge the protective lining against the protective jacket in the region of the spindle. A method of manufacturing the check valve includes forming the protective lining so that it has a greater inner diameter than the protective jacket. The synthetic plastic material of the protective lining is shrinkable so that after cooling of the protective lining it abuts against the protective jacket in the region of the throttling disc of the throttle valve.

5 Claims, 4 Drawing Figures

BUTTERFLY VALVE ASSEMBLY AND METHOD OF MANUFACTURING THE SAME

CROSS-REFERENCE TO RELATED APPLICATION

This application is a continuation-in-part application of my copending application Ser. No. 974,568 filed Dec. 29, 1978, entitled "BUTTERFLY VALVE" now abandoned.

BACKGROUND OF THE INVENTION

The present invention relates to a check valve assembly, particularly for aggressive media, and a method of manufacturing the same. More particularly, it relates to a check valve assembly which has a housing, and a throttle valve which includes a throttling disc rotatable in the housing and a spindle guided in the housing and rotating the throttling disc.

Check valves of the above-mentioned general type are known in the art. The throttling disc of such a check valve may be arranged centrally or eccentrically. The check valve may have a one-piece or two-piece outer ring. The spindle or journals may be cast on or welded to the throttling disc or may loosely extend through the latter. Various embodiments of this check valve depend more or less on different applications or respective manufacturing possibilities. When such check valves are utilized in an aggressive medium, it is necessary to manufacture all parts of the check valve, which in operation are in contact with the aggressive medium, from a material which resists the deleterious action of the latter. It has been proposed to manufacture the throttling disc from a synthetic plastic material or to coat the throttling disc by this material. It is also known to manufacture the protective lining connected with the housing of the check valve, from an elastomeric or another suitable material. In the check valves in which the throttling disc is coated by a synthetic plastic material, this coating extends only to the transition area between the throttling disc and the spindle connected to the latter. The protective lining of the housing also extends only somewhat into the above-mentioned transition area.

However, during the rotary movement of the throttle valve, for example, as a result of the sliding movement, small quantities of the medium leak or diffuse through or between the seals so that in operation with aggressive media undesirable and detrimental corrosion takes place. It has been recognized that this corrosion can be avoided by inserting special seals and/or utilizing corrosion-resistant fine steel for the parts of the check valve which are in contact with the aggressive media during the operation. In spite of these measures which are relatively expensive in the sense of the construction and material consumption, the results have not been satisfactory.

SUMMARY OF THE INVENTION

Accordingly, it is an object of the present invention to provide a check valve assembly, particularly for aggressive media, and a method of manufacturing the same, which avoid the disadvantages of the prior art.

More particularly, it is an object of the present invention to provide a check valve assembly and a method of manufacturing the same, which guarantee improvement of the corrosions resistance of the check valve, particularly as a result of preventing leakage of the medium through the seals of the check valve assembly.

In keeping with these objects and with others which will become apparent hereinafter, one feature of the present invention resides, briefly stated, in a check valve assembly in which a one-piece protective jacket of a synthetic plastic material is provided the jacket coating a throttling disc of the throttle valve and a spindle of the latter, including a portion of the spindle which extends outwardly beyond a housing of the check valve.

In such a construction, the one-piece protective jacket which is resistant to the aggressive media, completely protects the throttling disc and the spindle of the throttle valve from the aggressive medium so that in the cases when small quantities of the medium leak through the seals, they will travel only on the outer surface of the protective jacket and then discharge outwardly of the housing, for example to the outer atmosphere.

The housing main part and guiding portions, especially when they are constituted by a synthetic plastic material, may be coated by a one-piece protective lining of a synthetic plastic material which coats the guiding portions, including the regions of the latter which extend outwardly beyond the main portion of the housing. The one-piece lining protects the housing from the aggressive medium, and when small quantities of the medium leak through the seals they travel between the protective jacket of the throttle valve and the protective lining of the housing whereafter they discharge into the atmosphere.

A method of manufacturing the above-described check valve assembly includes the steps of coating the throttling disc and spindle of the throttle valve by a protective jacket of a synthetic plastic material, inserting the thus-coated throttle valve into a tool, and pouring a synthetic plastic material into the latter so as to form a protective lining which coats the housing and surrounds the protective jacket of the throttle valve, wherein the protective lining has an inner diameter exceeding the outer diameter of the protective jacket in the region of the throttling disc of the throttle valve. Preferably, the protective lining of the housing has such shrinking characteristics which guarantee that when the protective lining shrinks as a result of cooling, it firmly abuts against the protective jacket of the throttle valve in the region of the throttling disc. More particularly, the protective lining of the housing has higher shrinking value than that of the protective jacket of the throttle valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
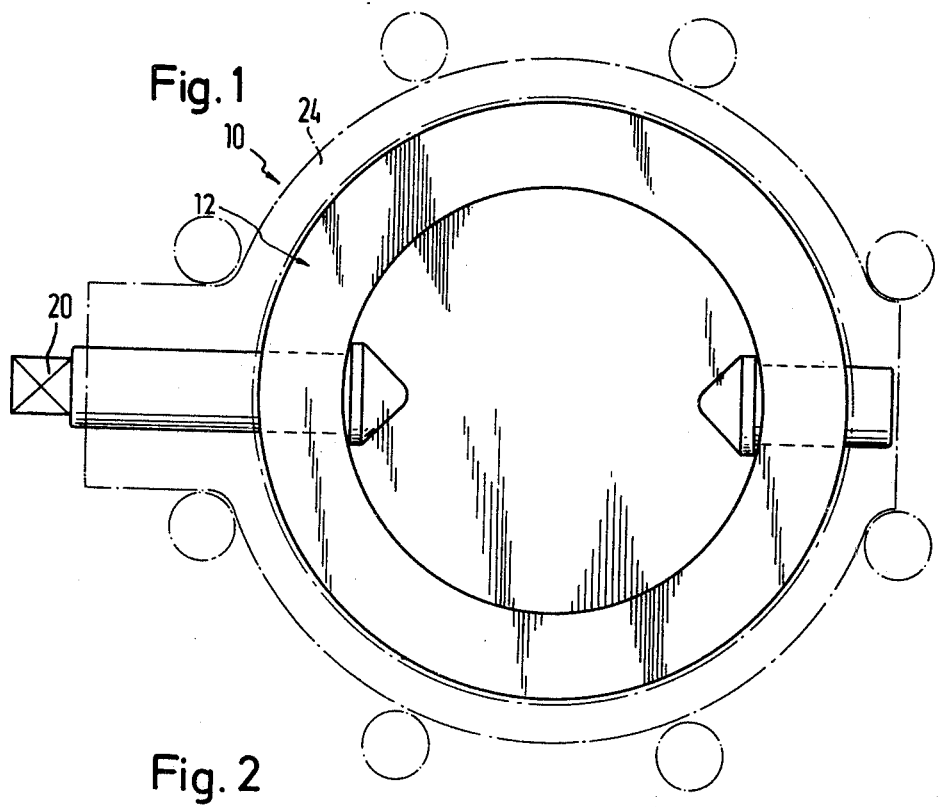
FIG. 1 is a schematic side view of a check valve assembly in accordance with the present invention.
Figure 2:
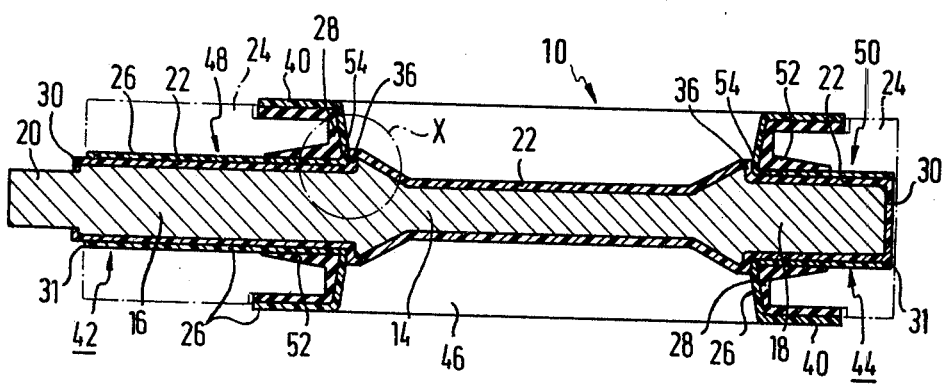
FIG. 2 is a longitudinal section of the check valve assembly shown in FIG. 1.
Figure 3:
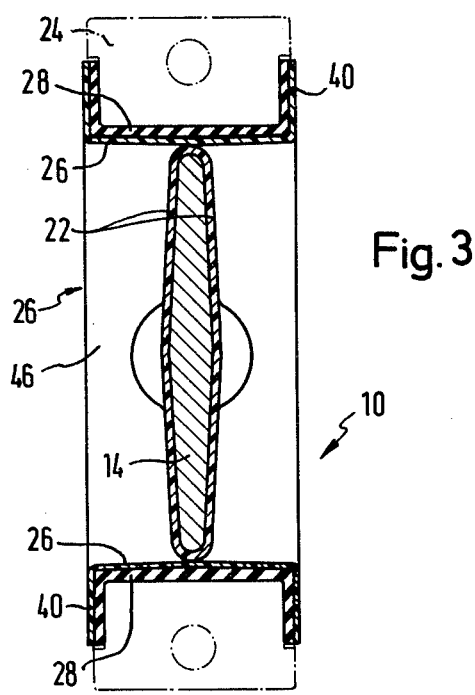
FIG. 3 is a transverse section of the check valve assembly shown in FIG. 1; and, FIG. 4 is a fragmentary enlarged detail view showing the area designated "X" in FIG. 2.

A check valve assembly in accordance with the present invention is identified in toto by reference numeral 10. It has a schematically shown housing 24 in which a throttle valve 12 is mounted. The throttle valve 12 includes a throttling disc 14 and a spindle connected with the latter. The spindle is composed of an upper spindle part 16 and a lower spindle part 18, depending on the mounting position of the spindle.

The spindle parts 16 and 18 are rotatably guided and supported in the housing 24. The upper spindle part 16 is provided with a tetrahedral portion 20 which serves for rotating the spindle 16, 18 together with the throttling disc 14 so as to bring the latter to the desirable position. This can be performed manually or by a motor drive.

As shown in the drawing, the spindle 16, 18 and the throttling disc 14 are integral with one another. For example, the spindle parts 16 and 18 may be cast on or welded to the throttling disc 14, or firmly connected to the latter in another manner. Contrary to the one-piece construction, the throttle valve may also be of two pieces.

The throttle valve 12, that is, the throttling disc 14 and spindle parts 16 and 18, is provided with a protective jacket 22. The protective jacket 22 completely surrounds the throttling disc 14, the lower spindle part and the upper spindle part 16. It also surrounds portions 30 of the spindle parts 16 and 18, which are located adjacent to the ends of these parts and outside of the housing 24. In practice, the coating or jacket 22 can project outwardly from the housing or be flushly connected with the same.

When the throttle valve 12 is now inserted into the housing 24, small quantities of the medium which leak through the seals can travel only between the outer side of the protective jacket 22 and the inner side of the housing 24, whereafter they discharge outwardly in the region of the portions 30. Thereby, the aggressive medium cannot contact with the throttling disc 14 or the spindle parts 16 and 18 of the throttle valve 12. This construction is acceptable when the housing 24 is also constituted by a synthetic plastic material which is resistant to the working medium.

In the shown embodiment of the present invention, the housing 24 is provided with a protective lining 26 which coats the entire inner side of the housing 24 and the inner side of guiding portions 42 and 44, which guide the spindle portions 16 and 18 over the entire length of the guiding portions. The protective lining 26 is of one piece and extends in the region of the guiding portions 42 and 44 to outer axial ends 31 of both guiding portions. In other words, it extends to the regions 30 located outside of the housing 24. The protective lining may terminate flushly with the housing 24 or project somewhat outwardly beyond the same.

The protective lining 26 has a tubular section 46 arranged to accommodate a not shown seals cooperating with the throttling disc 14. The protective lining 26 further has two sleeve sections 48 and 50 which extend transversely to section 46. Finally, it has two flat flanges 40 which form the sealing faces of a not-shown tubular conduit in which the check valve is built-in or with which the check valve is flanged together.

The protective lining 26 is supported by an elastic lining 28 which is arranged between the protective lining 26 and the housing 24. In the region of the spindle parts 16 and 18 the elastic lining 28 is sleeve-shaped and surrounds the protective lining 26 over a part of the axial length of the spindle parts 16 and 18. The housing 24 and the sleeve-shaped portion of the supporting lining 28 are conical so that, during assembling, the sleeve-shaped portion 52 of the supporting lining 28 is urged radially outwardly against the housing 24. Thereby, a seal is formed between the protective lining 26 and the protective jacket 22 in the region of the sleeve-shaped portion 52. A further seal will be formed between a shoulder 36 in the region of transition from the throttling disc 14 to the spindle parts 16 and 18 and a shoulder 54 of the protective lining 26.

The elastic supporting lining 28 may be constituted, for example, by an elastomeric material such as PERBUNAN (TM), the protective lining 26 and the protective jacket 22 may be constituted by a tetrafluoroethylene material, such as TEFLON (TM) or HALAR (TM), and the throttling disc 14 and the spindle parts 16 and 18 may be constituted by cast steel.

Figure 4:
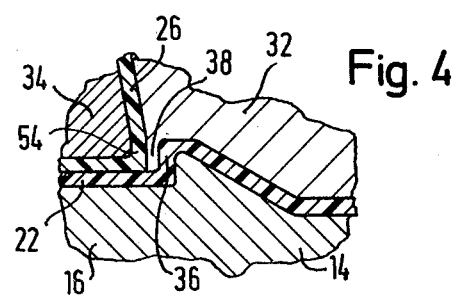

The above described check valve is manufactured in the following manner. First, the throttling disc 14 is manufactured together with the spindle parts 16 and 18, for instance by casting. It is also possible to weld the spindle parts 16 and 18 to the throttling disc 14 or to connect the former to the latter by other methods. Then, the throttle valve 12 which includes the throttling disc 14 and the spindle parts 16 and 18, is coated by protective jacket 22, for example by extruding a synthetic plastic material about the throttle valve 12. The coated throttle valve 12 is inserted into a tool, an enlarged detail of which is shown in FIG. 4. The tool is composed of two parts 32 and 34. The tool parts 32 is provided with a bead 38 which overlaps the shoulder 36 and surrounds the protective lining 22 in the region of the spindle part 16 as a sleeve or a collar. The axial dimension of the bead may be equal to for instance, from 2 mm to 3 mm. The inner diameter of the tubular section 46 of the protective lining 26 during the injecting process is, thereby, greater than the outer diameter of the throttling disc 14 including the protective jacket 22 by 4-6 mm. The material of the protective lining 26 must have sufficient shrinking characteristics so as to compensate this diameter difference and to shrink on the throttling disc so that the protective lining 26 in the region of the section 46 firmly abuts against the outer circumference of the throttling disc 14 coated by the protective jacket 22, after the cooling step.

It has to be assured that during injecting of the protective lining 26 the material of the latter will not bond with the just-injected protective jacket 22. This can be avoided by a respective material selection. It is also possible to fit, during the extrusion process, a thin sleeve over the portion of the protective jacket 22 surrounding the spindle parts 16 and 18. It is further possible to apply a separating agent on the outer surface of the protective jacket 22 in the region of the spindle parts 16 and 18. The shrinking characteristics of the protective lining 26 are such that it firmly abuts against the outer surface of the protective jacket 22, for example in the case when an intermediate sleeve is placed therebetween for separating them from each other during extrusion of the protective lining 26. The shrinking value of the protective lining 26 must exceed that of the protective jacket 22.

It will be understood that each of the elements described above, or two or more together, may also find a useful application in other types of constructions differing from the types described above.

While the invention has been illustrated and described as embodied in a check valve assembly and a method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A check valve assembly, particularly for aggressive media, comprising a housing having a main section and two guiding sections extending outwardly from said main section, said sections of said housing having inner sides; a throttle valve having a throttling disc rotatably arranged in said housing and a spindle which is connected with said throttling disc to rotate the latter, said spindle having an axis and including a first portion extending outwardly beyond said housing, and a second portion axially spaced from said first portion, said first and second portions of said spindle being rotatably guided in said respectively guiding sections of said housing so as to allow rotation of said throttling disc; a protective jacket which is of one piece and which completely coats said throttling disc and said portions of said spindle; a protective lining which is of one piece and completely coats said inner sides of said main section and said guiding sections of said housing; and an elastic supporting lining which abuts against said protective lining and including a portion which urges the latter against said protective jacket in the region of said respective portions of said spindle in said guiding sections with simultaneous formation of a seal between said guiding sections and said respective spindle portions.

2. A check valve assembly as defined in claim 1, wherein said protective jacket is constituted by a synthetic plastic material.

3. A check valve assembly as defined in claim 1, wherein said protective lining is constituted by a synthetic plastic material.

4. A check valve assembly as defined in claim 1, wherein said guiding sections of said housing have laterally extending outer ends, said protective lining extending up to said laterally outer ends of said guiding sections of said housing.

5. A check valve assembly as defined in claim 1, wherein said elastic supporting lining includes two radially extending collars each of which radially surrounds said protective lining and urges the latter radially against a respective one of said portions of said spindle.

* * * * *